US012656619B2

(12) United States Patent
Chambers et al.

(10) Patent No.: US 12,656,619 B2

(45) Date of Patent: Jun. 16, 2026

(54) FACIAL INTERFACE FOR ELECTRONIC DEVICE

(71) Applicant: Apple Inc., Cupertino, CA (US)

(72) Inventors: Trevor S. Chambers, San Diego, CA (US); Barry D. Curtin, Seattle, WA (US); Adam Y. Kollgaard, Bainbridge Island, WA (US); Joel Ebers, Seattle, WA (US); Thomas R. Matzinger, Half Moon Bay, CA (US); Patrick J. Crowley, Santa Clara, CA (US); Matin Seadat Beheshti, Sunnyvale, CA (US); Kevin Ceurter, Olympia, WA (US); John Cagle, San Jose, CA (US); Killian J. Poore, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/044,904

(22) Filed: Feb. 4, 2025

(65) Prior Publication Data

US 2026/0023266 A1     Jan. 22, 2026

Related U.S. Application Data

(60) Provisional application No. 63/674,061, filed on Jul. 22, 2024.

(51) Int. Cl.
*G09G 5/00* (2006.01)
*G02B 27/01* (2006.01)

(52) U.S. Cl.
CPC ..... *G02B 27/0176* (2013.01); *G02B 27/0101* (2013.01); *G02B 2027/0138* (2013.01)

(58) Field of Classification Search
CPC ........... G02B 27/0176; G02B 27/0101; G02B 2027/0138
USPC .......................................................... 345/8
See application file for complete search history.

(56) References Cited

U.S. PATENT DOCUMENTS

| | | | |
|---|---|---|---|
| 2020/0233453 A1* | 7/2020 | Hatfield | G06F 1/1637 |
| 2021/0041706 A1* | 2/2021 | Hatfield | G06F 1/163 |
| 2021/0080996 A1* | 3/2021 | Hudman | G02B 27/0176 |
| 2021/0208393 A1* | 7/2021 | Clark | G01B 11/24 |
| 2024/0192509 A1* | 6/2024 | Morris | F16M 13/04 |

* cited by examiner

*Primary Examiner* — Jonathan M Blancha

(74) *Attorney, Agent, or Firm* — Dorsey & Whitney LLP

(57) ABSTRACT

A facial interface for a head-mounted display device can include a first frame, a second frame, and a linear actuator movably coupling the first frame to the second frame. The linear actuator can be coupled to the first frame at a first end and defines a spherical portion at a second end opposite the first end. The facial interface can further include a plate movably secured to the second frame, and the plate can define a slot configured to receive the spherical portion of the linear actuator.

19 Claims, 7 Drawing Sheets

FACIAL INTERFACE FOR ELECTRONIC DEVICE

CROSS-REFERENCE TO RELATED APPLICATION(S)

This application claims priority to U.S. Provisional Patent Application No. 63/674,061, filed 22 Jul. 2024, and entitled "FACIAL INTERFACE FOR ELECTRONIC DEVICE," the entire disclosure of which is hereby incorporated by reference.

FIELD

The described embodiments relate generally to wearable electronic devices. More particularly, the present embodiments relate to head-mountable display devices and facial interface methods thereof.

BACKGROUND

Recent advances in portable computing have led to an increase in the use of head-mounted devices. For extended use, comfort is a critical factor in user adoption of head-mounted devices. A key component impacting comfort is the facial interface, which rests against the user's face and transmits the weight of the head-mounted device. Current facial interfaces for head-mounted devices are often made from a one-size-fits-all mold and have limited adjustability, leading to pressure points and discomfort for users with different facial features and head shapes. Adjustability of current head-mounted devices do not fully address the issue of pressure points and discomfort. Therefore, what is needed in the art is an adjustable facial interface that can comfortably conform to a wider range of facial shapes and sizes, while remaining stable during use. This would improve user comfort and broaden the potential user base for head-mounted devices.

SUMMARY

In at least one example of the present disclosure, a facial interface for a head-mounted display device can include a first frame. In some examples, the facial interface also includes a second frame. In some examples, the facial interface also includes a linear actuator movably coupling the first frame to the second frame. In some examples, the facial interface also includes where the linear actuator is coupled to the first frame at a first end and defines a spherical portion at a second end opposite the first end, the facial interface can further include a plate movably secured to the second frame, and the plate can define a slot configured to receive the spherical portion of the linear actuator. In some examples, the facial interface can also include where the second frame is more flexible than the first frame. In some examples, the facial interface can also include where the plate is translatable relative to the second frame in a first direction, and the slot extends in a second direction different than the first direction. In some examples, the facial interface can also include where the movable coupling between the linear actuator and the second frame defines five degrees of freedom. In some examples, the facial interface can also include where the first end of the linear actuator is fixedly coupled to the first frame. In some examples, the facial interface can further include a light seal including the second frame. In some examples, the facial interface can also include where the linear actuator is configured to be driven in response to an input from a user.

In at least one example of the present disclosure, a head-mounted display device can also include a display assembly including a frame. In some examples, the head-mounted display device also includes a display assembly including a window. In some examples, the head-mounted display device also includes a display assembly including a light source configured to produce content displayed at the window. In some examples, the head-mounted display device also includes a display assembly including a facial interface. In some examples, the head-mounted display device also includes a display assembly including a first adjustment motor extending from the frame to the facial interface. In some examples, the head-mounted display device also includes a display assembly including a second adjustment motor extending from the frame to the facial interface. In some examples, the head-mounted display device also includes a display assembly including where the window is disposed between the first adjustment motor and the second adjustment motor, the first adjustment motor is coupled to the facial interface at a first attachment point translatable in a first direction and a second direction relative to the facial interface, and the second adjustment motor is coupled to the facial interface at a second attachment point translatable in the first direction. In some examples, the head-mounted display device can also include where the first adjustment motor defines a distance between the frame and the facial interface.

In some examples, the head-mounted display device can further include a button electrically coupled to the first adjustment motor, where a manipulation of the button causes the first adjustment motor to change the distance. In some examples, the head-mounted display device can also further include a sensor configured to collect data, and a processor electrically coupled to the sensor, the first adjustment motor, and the second adjustment motor, the processor configured to drive the first adjustment motor and the second adjustment motor in response to the data. In some examples, the head-mounted display device can also include where at least one of the first adjustment motor or the second adjustment motor is movably coupled to the frame. In some examples, the head-mounted display device can also include where the first adjustment motor defines a spherical portion, and the first attachment point defines a slot configured to receive the spherical portion. In some examples, the head-mounted display device can also include where at least one of the first adjustment motor or the second adjustment motor is configured to adjust according to a user profile.

In at least one example of the present disclosure, a display assembly for a head-mounted display device can include a frame, a display coupled to the frame, a facial interface, and at least two linear motors fixed to the frame, each linear motor of the at least two linear motors including a spherical joint rotatably secured to the facial interface. In some examples, the display assembly can also include where each linear motor of the at least two linear motors includes a piston extending between the frame to the facial interface. In some examples, the display assembly can also include where each linear motor of the at least two linear motors is configured to disengage in response to an applied force above a threshold. In some examples, the display assembly can also include where each linear motor of the at least two linear motors is coupled to the facial interface at an attachment point translatable in a first direction and a second direction relative to the facial interface. In some examples, the display assembly can also include where each linear motor of the at least two linear motors actuates independently. In some examples, the display assembly can also include where the at least two linear motors are configured to actuate in unison.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
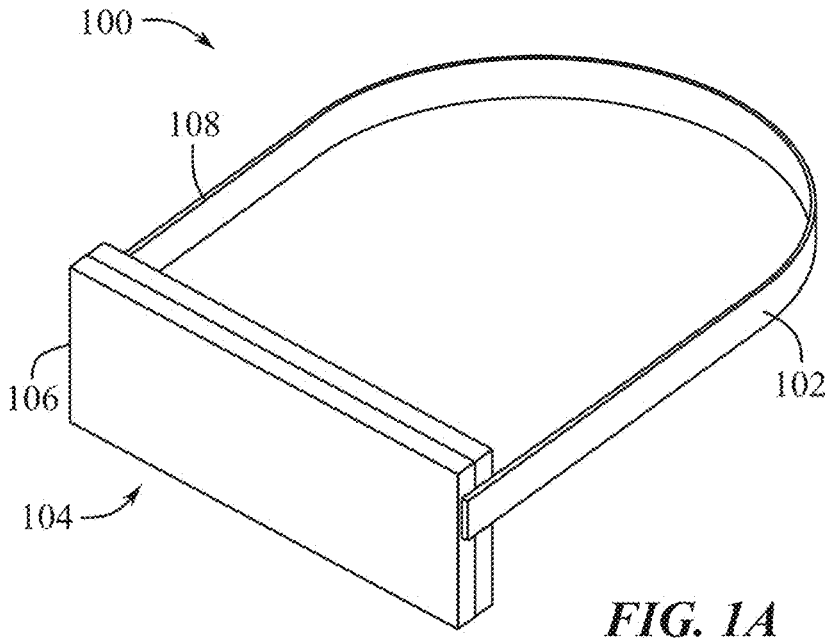
FIG. 1A shows a front perspective view of an example of a head-mounted display device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to display assemblies and facial interfaces for head-mounted display devices. Current facial interfaces for head-mounted devices are often made from a one-size-fits-all mold and have limited adjustability, leading to pressure points and discomfort for users with different facial features and head shapes. Adjustability of current head-mounted devices do not fully address the issue of pressure points and discomfort. Accordingly, devices and systems for head-mountable device described herein include adjustable facial interfaces that comfortably conform to a wide range of facial shapes and sizes while remaining stable during use. The devices, systems, and methods of the present disclosure improve user comfort and broaden the potential user base for head-mounted devices.

In order to realize these and other advantages, in some examples, a facial interface can include one or more frames coupled together by one or more linear actuators. At least one frame can rest against a face of a user during use, and the linear actuators can control the distance between the one or more frames. The facial interface can include a window configured to display content to a user. The window can be disposed within or secured to a frame and can define an eye relief distance. The linear actuators can effect the eye relief distance by changing the distance between the one or more frames. In some examples, the linear actuators can be movably coupled to the one or more frames. The linear actuators can be driven independently or in unison to change the distance between the one or more frames or an angle between the one or more frames. Translational and rotational adjustability between the frames via the linear actuators can allow the facial interface to conform to a wide variety of user facial features and head shapes.

In some examples, the linear actuators can extend from one frame to a second frame. The linear actuators can be fixed to the first frame and coupled to the second frame via one or more plates. The one or more plates can be coupled to the second frame and can each define slots. In some examples, the linear actuators can each include a piston. Each piston can define a spherical portion at one end. The slot of each plate can be configured to receive a spherical portion. In some examples, the spherical portion of each piston can displace along the slot of the corresponding plate. The spherical portion can also rotate about at least one axis relative to the plate. In some examples, at least one of the plates can be translatably coupled to the second frame in at least one direction. The translatable and rotatable nature of the coupling between the linear actuator and the second frame can allow any number of the pistons to extend or retract, causing the second frame to translate or rotate relative to the first frame. Translation and/or rotation of the second frame relative to the first frame can change the characteristics of the facial interface, facilitating a comfortable and personalized user experience.

In some examples, the second frame can be more flexible than the first frame. A flexible second frame can improve the comfort of the facial interface. In some examples, the face of a user can deform the second frame, changing the geometric relationship between the second frame and the movable couplings. In some examples, deformation of the second frame can result in a longer arc length of the second frame between two or more linear actuators. In such conditions, each spherical portion of each linear actuator can slide along the slot defined by each plate, allowing the second frame to deform without producing a shear stress or strain on the linear actuator.

In some examples, the linear actuators can be driven in response to input from a user. A user can interact with an input device included in the facial interface or can interact with a user interface displayed at the window. Driving the linear actuators in response to an input from a user can allow a user to customize the fit of the facial interface, facilitating an enjoyable user experience and enabling the user to wear the facial interface for longer periods of time or for more tasks than otherwise. In some examples, the facial interface can include one or more sensors configured to collect data. The data can be interpreted by a processor, and the linear actuators can be driven in response to the data. In some examples, data can be collected once, and the facial interface can be adjusted in response to selection of a user profile. In other examples, the one or more sensors can continuously collect data to drive the linear actuators in a feedback loop. In some examples, two, three, four, five, six, or more linear actuators can be included in the facial interface. The number of linear actuators can be optimized for comfort, processor demand, energy usage, or other parameters. In some examples, the linear actuators can change the shape of one or more facial interfaces to form a light seal between the face of a user and the facial interface.

These and other embodiments are discussed below with reference to FIGS. 1-7B. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1B:
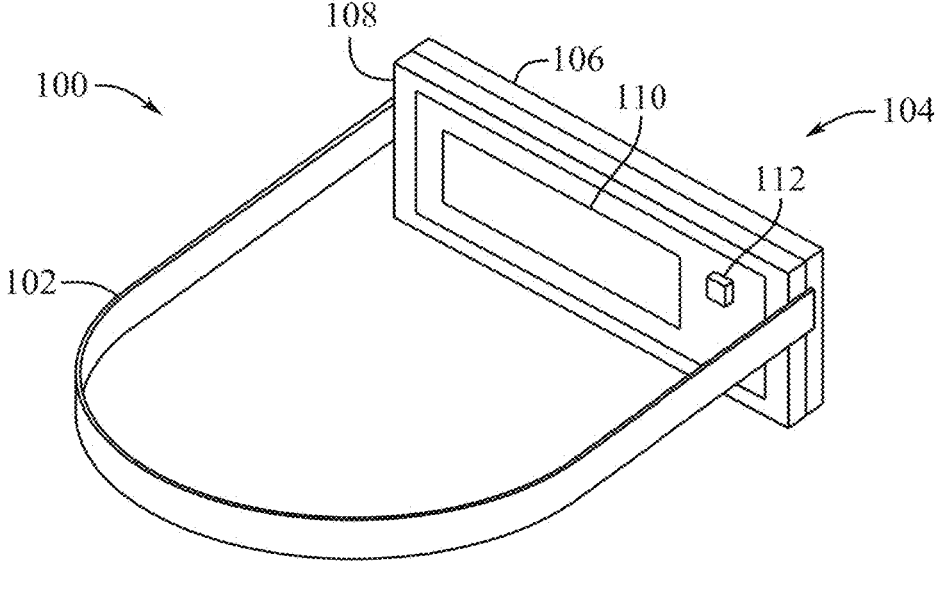
FIG. 1B shows a rear perspective view of an example of a head-mounted display device.

FIGS. 1A-1B show a head-mounted device 100. The head-mounted display device 100 can be configured to be mounted to the head of a user and display visual media to the user. In some examples, the visual media displayed by the head-mounted display device 100 can include videos, live streams, websites, recordings, virtual reality settings, television, or other forms of visual media. The head-mounted display device 100 can include a securement band 102. The head-mounted display device 100 can also include a facial interface 104 configured to rest on the face of a user. In some examples, the facial interface 104 can be a display assembly. The facial interface 104 can be coupled to the securement band 102 such that the head-mounted display device 100 is secured to the head of a user while in use. In some examples, the facial interface 104 can include a first frame 106 and a second frame 108. The facial interface 104 can further include a window 110, and a light source 112 configured to produce content displayed at the window 110. In some examples, the content produced by the light source 112 and displayed at the window 110 can be visual media.

In some examples, a light seal can include the second frame 108. A light seal can reduce or prevent light from entering the field of view of a user while the user is wearing the head-mounted display device 100. By preventing light from entering the field of view of a user, a light seal can reduce or remove external distractions that can distract a user or take away from the user experience. In some examples, a light seal can help improve the viewing experience of a user by blocking external light sources and allowing a user to become immersed in the content displayed at the window. In other examples, the second frame 108 can be at least partially transparent. A partially transparent second frame 108 can allow a user to perceive objects or people near or adjacent to the user. For example, an at least partially transparent second frame 108 can allow a user to move about a space while avoiding objects and people. In some examples, the head-mounted display device 100 can be configured to display a live stream of a user's environment, and display visual media superimposed over the live stream. An at least partially transparent second frame 108 can minimize the portion of a user's field of vision occupied by the second frame 108.

Any of the features, components, and/or parts, including the arrangements and configurations thereof shown in FIGS. 1A-1B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1A-1B. Examples of adjustable facial interfaces, movable couplings, and linear actuators are given below in reference to FIG. 2.

Figure 2:
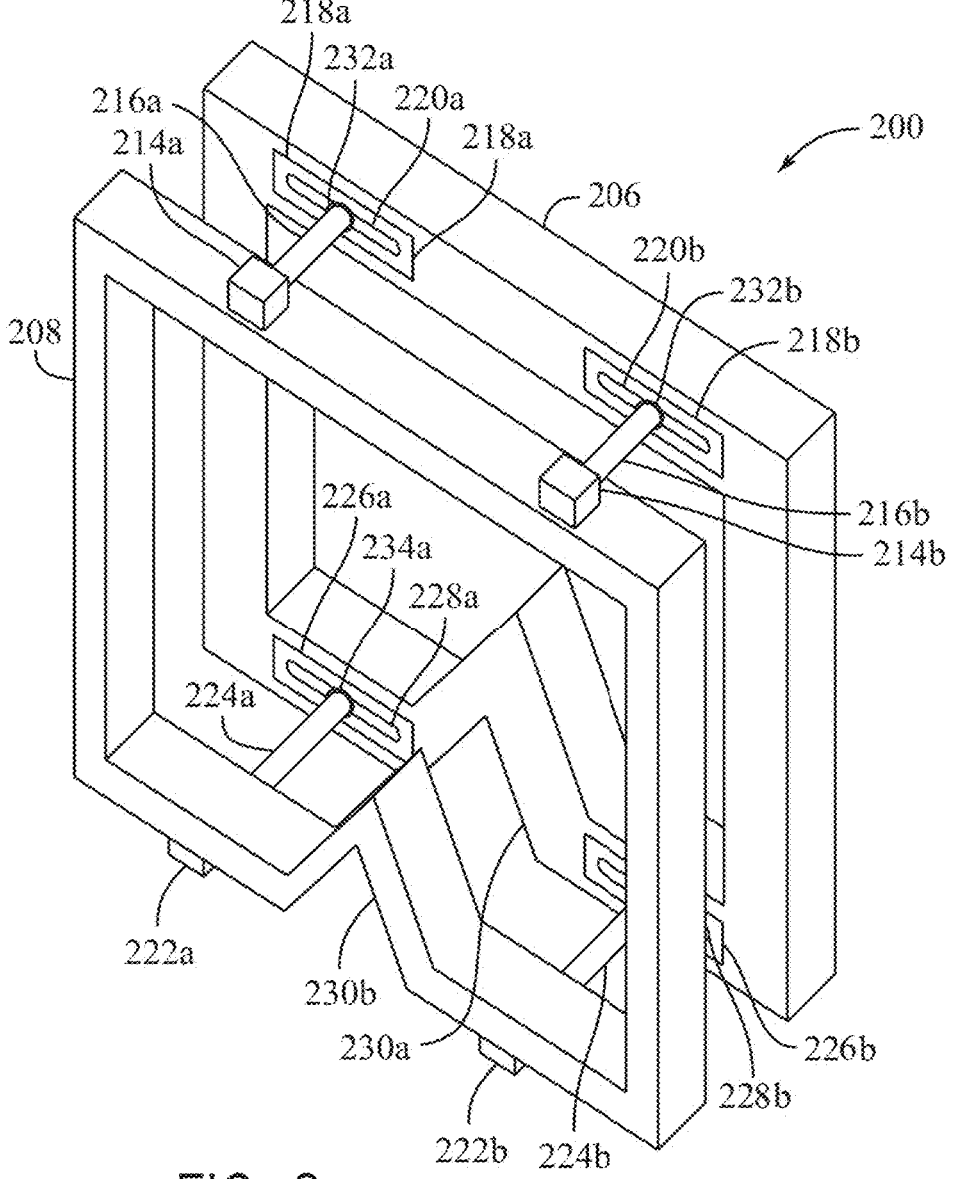
FIG. 2 shows a perspective view of an example of a facial interface.

FIG. 2 shows an example of a facial interface 200. The facial interface 200 can be adjustable and can conform to the face of a user. In some examples, the facial interface 200 can be configured to conform to the contours of a user's face and help facilitate a comfortable user experience. The facial interface 200 can include a first frame 208, a second frame 206, and a one or more linear actuators 214*a-b*, 222*a-b*. The first frame 206 and the second frame 208 can include support features 230*a-b*. The support features 230*a-b* can be configured to rest on the nose or nose bridge of a user, and support at least part of the weight of the facial interface 200. The support features 230*a-b* can also be configured to form a light seal about the nose of a user. In some examples, the one or more linear actuators 214*a-b*, 222*a-b* can movably couple the first frame 208 to the second frame 206. Each of the one or more linear actuators 214*a-b*, 222*a-b* can be coupled to the first frame 208 at a first end. The linear actuators 214*a-b* can define spherical portions 232*a-b* at a second end opposite the first end, and the linear actuators 222*a-b* can define spherical portions 234*a-b* at a second end opposite the first end (234*b* not shown). In some examples, the one or more linear actuators 214*a-b*, 222*a-b* can be fixedly secured to the first frame 208. The facial interface 200 can further include one or more plates 218*a-b*, and one or more plates 226*a-b*. In some examples, at least one of the plates 218*a-b*, 226*a-b* can be movably secured to the second frame 208. The plates 218*a-b* can include slots 220*a-b*, configured to receive the corresponding spherical portions 232*a-b*, and the plates 226*a-b* can include slots 228*a-b* configured to receive the corresponding spherical portions 234*a-b*.

In some examples, the linear actuators 214*a-b*, 222*a-b* can be adjustment motors. One or more of the linear actuators 214*a-b*, 222*a-b* can be configured to define a distance between the first frame 206 and the second frame 208. At least one of the linear actuators 214*a-b*, 222*a-b* can be configured to change the distance between the first frame 206 and the second frame 208. The linear actuators 214*a-b*, 222*a-b* can include pistons 216*a-b*, 224*a-b* defining the spherical portions 232*a-b*, 234*a-b* received by the plates 218*a-b*, 226*a-b*. The pistons 216*a-b*, 224*a-b* can extend or retract from the first frame 206, thereby changing the distance between the first frame 206 and the second frame 208. In some examples, the second frame 208 can be configured to abut the face of a user, and the distance between the first frame 206 and the second frame 208 can affect a relief distance between a user's eyes and the first frame 206. In some examples, the first frame 206 can include a window configured to display content to a user, similar to the second frame 108 including a window 110 described in reference to FIG. 1B. The relief distance between the first frame 206 and the user's eyes can affect the user experience, quality of the content displayed, or the amount of time a user can comfortably use the facial interface 200. Therefore, at least one linear actuator 214*a-b*, 222*a-b* defining a distance between the first frame 206 and the second frame 208 can help improve the quality of the content perceived by a user, enable a user to utilize the facial interface 200 for longer periods of time, and facilitate an overall more comfortable user experience.

In some examples, the spherical portions 232a-b, 234a-b and the plates 218a-b, 226a-b can form movable couplings. The movable couplings defined by 232a and 218a, 232b and 218b, 234a and 226a, and 234b and 226b, can allow the second frame 208 to translate, rotate, or otherwise displace relative to the first frame 206 as one or more of the linear actuators 214a-b, 222a-b changes the distance between the first frame 206 and the second frame 208. The movable couplings can define various degrees of freedom between the spherical portions 232a-b, 234a-b and the second frame 208. In some examples, the movable couplings can define five degrees of freedom between the spherical portions 232a-b, 234a-b and the second frame 208. The degrees of freedom defined by the movable coupling can include translation in two directions along the exterior of the second frame 208. The degrees of freedom defined by the movable coupling can also include rotation of the spherical portions 232a-b, 234a-b in the form of pitch, roll, and yaw. In some examples, the plates 218a-b and the plates 226a-b can have different degrees of freedom. For example, the plates 218a-b can be movably secured to the second frame 208, and the plates 226-b can be fixedly secured to the second frame 208.

In some examples, the second frame 208 can be more flexible than the first frame 206. A second frame 208 that is more flexible than the first frame 206 can conform to the contours of a variety of user head shapes and facial features. A second frame 208 that conforms to a variety of head shapes and facial features can facilitate a comfortable user experience for as many people as possible. Additionally, a second frame 208 that is more flexible than the first frame 206 can allow the second frame 208 to form a light seal around the eyes of a user, creating an engaging user experience. In some cases, deformation of a flexible second frame 208 can change one or more geometric properties of the connection between the first frame 206 and the second frame 208. As the second frame 208 deforms, and the distance between the first frame 206 and the second frame 208 changes, the movable couplings described above can allow the geometric relationship between the first frame 206 and the second frame 208 to change. In some examples, the spherical portions 232a-b, 234a-b can displace along a line or are defined by the slots 220a-b, 228a-b. For example, the spherical portion 232a can displace along the length of the slot 220a. The spherical portions 232a-b, 234a-b can also rotate relative to the plates 218a-b, 226a-b. In some examples, at least one plate of the plates 218a-b, 226a-b can be translatable relative to the second frame 208 in a first direction, and at least one slot of the slots 220a-b, 228a-b can extend in a second direction different than the first direction.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figures 3A, 3B, 3C:
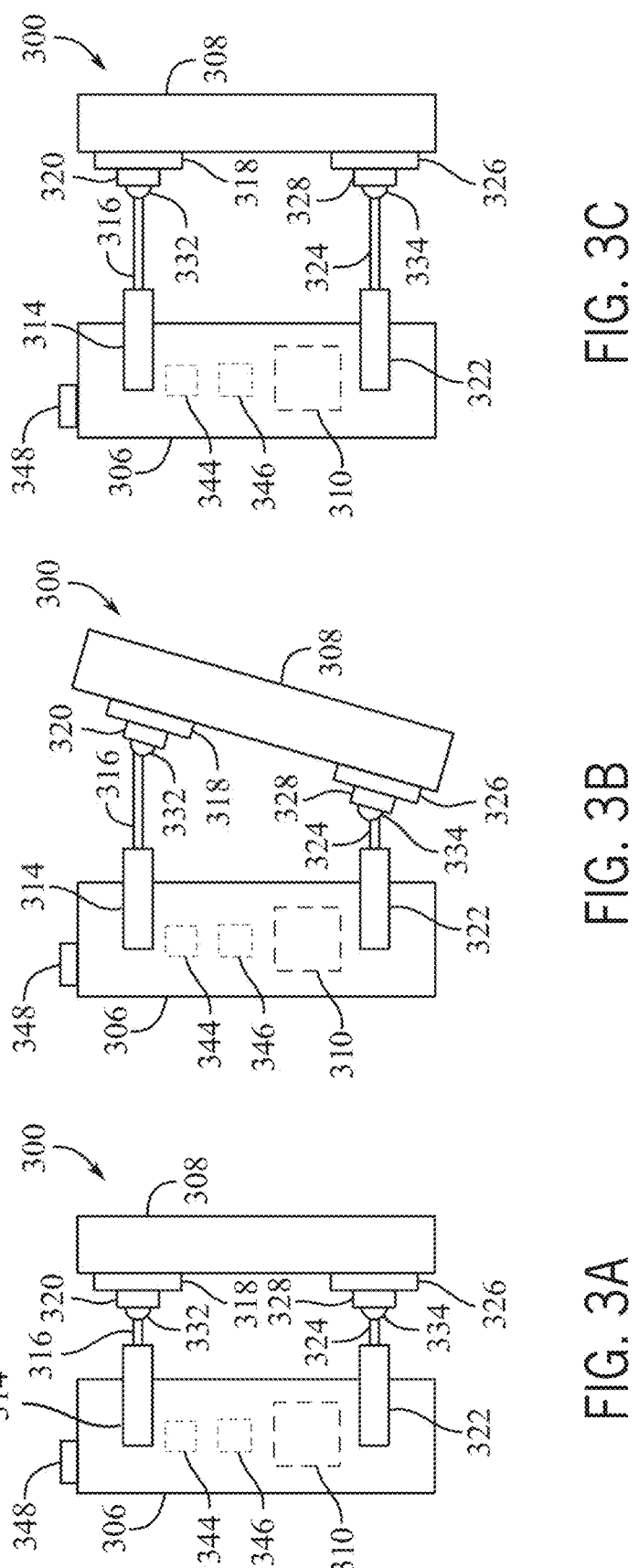
FIG. 3A shows a side view of an example of a facial interface in a first position.
FIG. 3B shows a side view of an example of a facial interface in a second position.
FIG. 3C shows a side view of an example of a facial interface in a third position.

FIGS. 3A-3C show side views of a display assembly 300 in several different positions. In some examples, the display assembly 300 can be for a head-mounted display device. The display assembly 300 can be adjustable, and different positions of the display assembly 300 can fit or conform to various user head shapes and facial features. Adjustability of the display assembly 300 can facilitate a comfortable and desirable user experience. The display assembly 300 can include a frame 306, a facial interface 308, and a display 310 coupled to the frame 306. The display 310 can be a window can be configured to display content to a user. The facial interface 308 can be coupled to the frame 306 via one or more linear motors 314, 322. The linear motor 314 can be a first linear actuator, and the linear motor 322 can be a second linear actuator. In some examples, the display 310 can be disposed between the linear motor 314 and the linear motor 322. The linear motors 314, 322 can each include a piston 316, 324, respectively. Each piston 316, 324 can extend between the frame 306 and the facial interface 308. Each piston 316, 324 can also define a spherical portion 332, 334, respectively. The display assembly 300 can include one or more attachment plates 318, 326. Each attachment plate 318, 326 can define a slot 320, 324 configured to receive a spherical portion 332, 334. In some examples, the linear motor 314 can be secured to the frame 306, the piston 316 can extend from the frame 306 to the facial interface 308, the attachment plate 318 can be secured to the facial interface 308, and the slot 320 can be configured to receive the spherical portions 332. Likewise, the linear motor 322 can be secured to the frame 306, the piston 324 can extend from the frame 306 to the facial interface 308, the attachment plate 326 can be secured to the facial interface 308, and the slot 328 can be configured to receive the spherical portions 334.

In some examples, the linear motors 314, 322 can include a first end coupled to the frame 306, and a second end coupled to the facial interface 308. The first end of the linear motors 314, 322 can be fixedly coupled to the frame 306. The second end can be translatably coupled to the facial interface 308. The linear motors 314, 322 can include the attachment plates 318, 326. In some examples, each attachment plate 318, 326 can define an attachment point between the linear motors 314, 322, and the facial interface 308. For example, attachment plate 318 can define a first attachment point, and attachment plate 326 can define a second attachment point. In other examples, either or both linear motors 314, 322 can defines one spherical portion 332 or 334, and a first attachment point can define a slot 320 or 328 configured to receive the spherical portion 332 or 334.

Each linear motor 314, 322 can be coupled to the facial interface 308 at an attachment point translatable in a first direction and a second direction relative to the facial interface 308. For example, at least one of the attachment plates 318, 326 can be translatable in a first direction and a second direction relative to the facial interface 308. In some examples, attachment plate 326 is fixedly secured to the facial interface 308, and the attachment plate 318 is translatable relative to the facial interface 308. Translation of at least one attachment plate 318, 326 can allow the facial interface 308 to tilt relative to the frame 306 without changing the angle of the linear motors 314, 322. The attachment plates 318, 326 and the spherical portions 332, 334 can also form spherical joints. In some examples, the linear motors 318, 322 can be fixed to the frame 306, and each linear motor 314, 322 can include a spherical joint rotatably secured to the facial interface 308. In some examples, the linear motor 314 can be a first adjustment motor, and the linear motor 322 can be a second adjustment motor. The linear motors 314, 322 can be configured to extend or retract to change a distance between the frame 306 and the facial interface 308. The linear motor 314 can extend from the frame 306 to the facial interface, and the linear motor 322 can extend from the frame 306 to the facial interface 308. In some examples, the display 310 can be disposed between the linear motor 314 and the linear motor 322.

FIG. 3A shows the display assembly 300 in a first position. In the first position, the linear motors 314, 322 can define a first distance between the frame 306 and the facial interface 308. In some examples, the facial interface 308 can be configured to abut the face of a user, and the distance between the first frame 306 and the facial interface 308 can effect a relief distance between a user's eyes and the first frame 306. The relief distance can be the distance between a user's eyes and the display 310. The facial interface 308 can abut the face of a user, and the display 310 can be secured to the frame 306. Therefore, the distance between the frame 306 and the facial interface 308 can affect the relief distance. The relief distance can affect the user experience, quality of the content displayed, or the amount of time a user can comfortably use the display assembly 300. FIG. 3C shows the display assembly 300 in a third position, where the linear motors 314, 322 extend farther from the frame 306 relative to the first position. In some examples, the display assembly 300 shown in FIG. 3C can define a different relief distance between the display 310 and the eyes of a user. In some examples, different distances between the frame 306 and the facial interface 308 can facilitate clear image perception by a user who would normally require corrective lenses. In FIG. 3A and FIG. 3C, linear motors 314, 322 can extend or retract in unison.

FIG. 3B shows the display assembly 300 in a second position. In the second position, one linear motor can extend farther from the frame 306 than another linear motor. For example, linear motor 314 can extend farther than linear motor 322. In the second position, the linear motors 314, 322 can actuate independently of one another. Extension of linear motor 314 farther from the frame 306 relative to linear motor 322 can tilt the facial interface 308 relative to the frame 306. Tilting the facial interface 308 relative to the frame 306 can allow the facial interface 308 to abut various user faces with different facial features. For example, tilting the top of the facial interface 308 away from the frame 306 by extending linear motor 314 farther from the frame 306 relative to linear motor 322 can better fit a user with a nose or nose bridge farther forward than the user's forehead. In other examples, tilting the bottom of the facial interface 308 away from the frame 306 by extending linear motor 322 farther from the frame 306 relative to the linear motor 314 can fit a user with a forehead farther forward than the user's nose or nose bridge.

As the facial interface 308 tilts relative to the frame 306 in response to different extensions of the linear motors 314, 322, the spherical portions 332, 334 can rotate within the slots 320, 328. Additionally, at least one of the plates 318, 326 can translate along the exterior of the facial interface 308. Extending or retracting one or both of the linear motors 314, 322 can change the distance between the spherical portions 332, 334. Translation of at least one of the plates 318, 326 can allow the pistons 316, 324 to extend axially without rotating relative to the frame 306, while still changing the distance between the spherical portions 332, 334 secured to the facial interface 308 via the plates 318, 326. For example, as shown in FIG. 3B, plate 318 can translate toward plate 326 relative to the facial interface 308 when piston 316 extends farther from the frame 306 than piston 324. In another position, plate 318 can translate away from plate 326 relative to the facial interface 308 when piston 324 extends farther from the frame 306 than piston 316. The display assembly 300 can be configured to occupy any position between the first, second and third positions shown in FIGS. 3A-3C. The display assembly 300 can also be configured to occupy positions not shown in FIGS. 3A-3C.

In some examples, at least one of the linear motors 314, 322 can be configured to be driven in response to an input from a user. In some examples, input from a user can be gathered from a user interface. For example, a user can interact with information produced at the display 310 to drive the linear motors 314, 322 such that the position and/or fit of the facial interface 308 is adjusted. In other examples, the display assembly 300 can include at least one input device 348. The input device 348 can be a button, a switch, a lever, or another input device. In some examples, the input device 348 can be electrically coupled to the linear motor 314, wherein a manipulation of the input device 348 can cause the linear motor 314 to change the distance between the frame 3086 and the facial interface 308.

For example, a user can depress the input device 348, which can cause the linear motors 314, 322 to be driven in response to depression of the input device 348. Adjustment of the facial interface 308 via actuation of the linear motors 314, 322 in response to user input can allow a user to customize the fit of the display assembly 300. Customization of the fit of the display assembly 300 can facilitate a desirable user experience, enhance comfort of the display assembly 300, and allow a user to utilize the display assembly for a longer period of time.

In other examples, at least one of the linear motors 314, 322 can be configured to automatically adjust the facial interface 308 relative to the frame 306. In some examples, the display assembly 310 can include a sensor 344 and a processor 346. The sensor 344 can be configured to collect data, and the processor 346 can be electrically coupled to the sensor 344, the linear motor 314, and the linear motor 322. The processor 346 can be configured to drive the linear motor 314 and the linear motor 322 in response to the data. In some example, the sensor 344 can be a distance sensor configured to measure the distance between the frame 306 and the face of a user. The linear motors 314, 322 can be configured to be driven such that a desired distance is measured by the sensor 344. In other examples, the sensor 344 can be a camera configured to scan a user's face, measuring facial features. The linear motors 314, 322 can be configured to be driven in response to facial topography collected by the sensor 344. In yet other examples, the sensor 344 can measure the force exerted on the display assembly 300 by a user's face while the user is wearing the display assembly 300. The linear motors 314, 322 can be configured to be driven in response to the force measured by the sensor 344, such that the force exerted on the display device 300 by the head of a user remains within a range of forces.

In some examples, the linear actuators 314, 322 can form a feedback loop with the sensor 344. In this manner, the display assembly 300 can continuously adjust the linear motors 314, 322 in response to different users, different user activities, different user facial expressions, or other conditions. In other examples, the sensor 344 can measure the face of a user during a setup process and store the data. The display assembly 300 can store data from multiple users, and the various data can be used to drive the linear motors 314, 322 in response to a corresponding user profile. The user profile can be selected via the display 310, or the display assembly 300 can detect a nearby device and automatically select a user profile. In other examples, the sensor 344 can visually detect a user's face and automatically adjust the facial interface via the linear motors 314, 322 based on stored data. In yet other examples, the display device 300 can adjust the linear motors 314, 322 based on data from the sensor 344 every time a user dons or doffs the display assembly 300.

Any of the features, components, and/or parts, including the arrangements and configurations thereof shown in FIGS. 3A-3C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3A-3C. More examples of display assemblies including linear motors and facial interfaces are given below.

FIG. 4A shows a side view of another example of a display assembly 400. The display assembly 400 can include a frame 406, a facial interface 408, and linear motors 414, 422 coupling the facial interface 408 to the frame 406. The display assembly 400 can be worn on a user's face or head, and the facial interface 408 can be configured to comfortably fit a user's face. The linear motor 414 can include a piston 416 and a plate 418. The linear motor 422 can include a piston 424 and a plate 426. In some examples, the pistons 416, 424 can be fixedly coupled to the respective plates 418, 426. At least one of the linear motors 414, 422 can be movably coupled to the frame 406, and the plates 418, 426 can be translatably coupled to the facial interface 408. The combination of rotatable coupling of the linear motors 414, 422 to the frame 406, and translatable coupling of the plates 418, 426 can allow the facial interface 408 to translate, rotate, or otherwise displace relative to the frame 406. Translation, rotation, or other displacement of the facial interface 408 relative to the frame 406 can allow the display assembly 400 to adjust and comfortably fit a variety of user face shapes.

Figure 4:
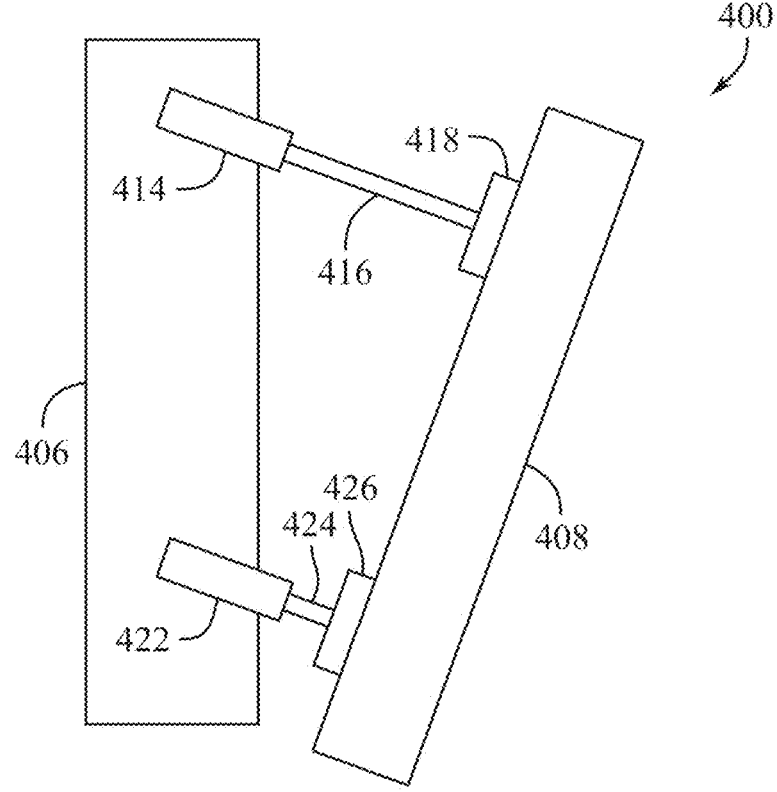
FIG. 4 shows a side view of another example of a facial interface.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4. More examples of adjustable display assemblies are given below in reference to FIGS. 5A-5B.

Figure 5A:
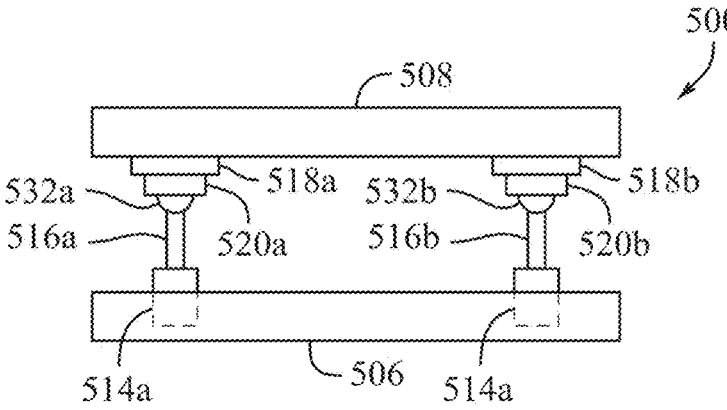
FIG. 5A shows a top view of an example of a display portion in a first state.
Figure 5B:
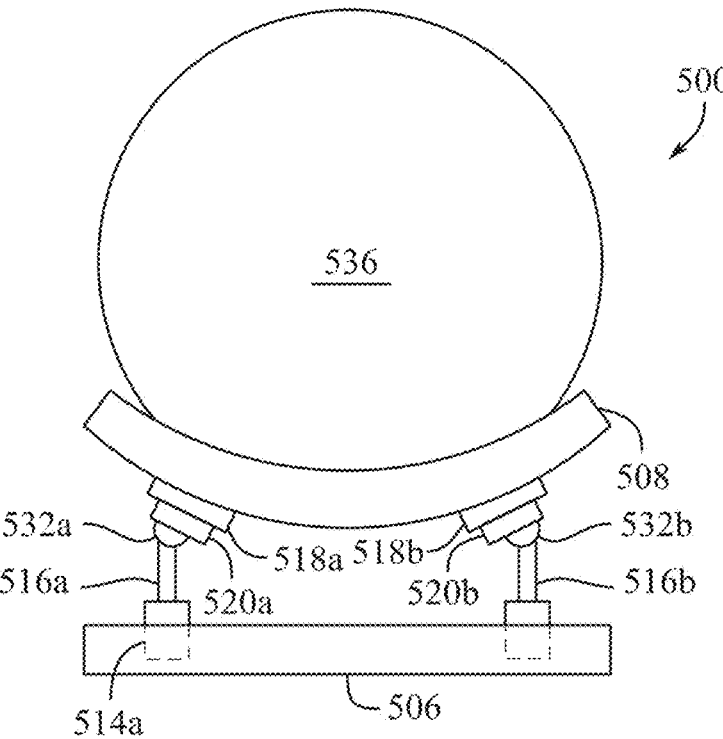
FIG. 5B shows a top view of an example of a display portion in a second state.

FIGS. 5A-5B show a top view of a display assembly 500 in a doffed and a donned state. The display assembly 500 can include a frame 506, a facial interface 508, and one or more linear motors 514*a-b*. The linear motors 514*a-b* can be at least partially disposed within the frame 506. In some examples, the linear motors 514*a-b* can be secured to the frame 506. Each of the linear motors 514*a-b* can include a piston 516*a-b*. Each piston 516*a-b* can define a round end 532*a-b*. The display assembly 500 can include one or more plates 518*a-b*. In some examples, each plate 518*a-b* can define a slot 520*a-b* configured to receive a respective round end 532*a-b*. In this manner, the facial interface 508 can be coupled to the frame 506 via the linear motors 514*a-b* and the plates 518*a-b*. In some examples, the facial interface 508 can be more flexible than the frame 506, allowing the facial interface 508 to conform to the head or face of a user.

FIG. 5A shows the display assembly 500 in doffed state. In the doffed state, the facial interface 508 can retain an original shape. For example, the facial interface 508 can be manufactured to fit a variety of facial structures, and the manufactured shape can be retained in the doffed state. In some examples, each of the linear motors 314*a-b* shown in FIGS. 5A-5B can be configured to actuate independently. Independent actuation of the linear motors 514*a-b* can allow the facial interface to tilt, rotate, or twist relative to the frame 506. By tilting, rotating, or twisting relative to the frame 506, the facial interface 508 can be configured to fit a variety of facial features and user head shapes. In other examples, the linear motors 314*a-b* shown in FIGS. 5A-5B can be configured to actuate in unison. Actuation of the linear motors 514*a-b* in unison can change the distance between the frame 506 and the facial interface 508 without tilting, rotating, or twisting the facial interface 508 relative to the frame 506. In some examples, actuating the linear motors 514*a-b* in unison can decrease energy or processing demands of the linear motors 514*a-b*. In some examples, the linear motors 514*a-b* can be configured to actuate independently under certain conditions and actuate in unison under other conditions.

FIG. 5B shows the display assembly 500 in a donned state. In the donned state, a head 536 of a user can exert a force on the facial interface 508, causing the facial interface 508 to bend, flex, or otherwise deform. Deformation of the facial interface 508 can allow the facial interface 508 to create a seal between the display assembly 500 and the head 536 of a user. The seal formed between the facial interface 508 and the head 536 of a user can prevent light from entering the field of view of a user, prevent foreign contaminants such as dirt or dust from entering the eye of a user, and distribute any forces experienced by a user across the greatest area possible. In some examples, deformation of the facial interface 508 can facilitate a comfortable and desirable user experience. For example, a soft, flexible facial interface 508 can minimize localized forces on the head 536 and reduce fatigue from wearing the display assembly 500.

In the doffed state shown in FIG. 5A, the round ends 532*a-b* can be centrally disposed within the slots 520*a-b*. In the donned state shown in FIG. 5B, the round ends 532*a-b* can be displaced relative to the disposition of the round ends 532*a-b* within the slots 520*a-b* in doffed state. As the facial interface 508 is bent or otherwise deformed by the head 536, the distance between the round ends 532*a-b* can remain constant, while the arc length of the facial interface 508 between the round ends 532*a-b* can increase. To compensate for the increased length of facial interface 508 disposed between the round ends 532*a-b*, each round end 532*a*, 532*b* can slide or displace along the corresponding slot 520*a*, 520*b*. By allowing the round ends 523*a-b* do displace within the slots 520*a-b*, the plates 518*a-b* can allow the facial interface 508 to flex, bend, or otherwise conform to different head shapes or facial structures. In this manner, the display assembly 500 can facilitate a comfortable user experience.

Any of the features, components, and/or parts, including the arrangements and configurations thereof shown in FIGS. 5A-5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5B.

Figure 6A:
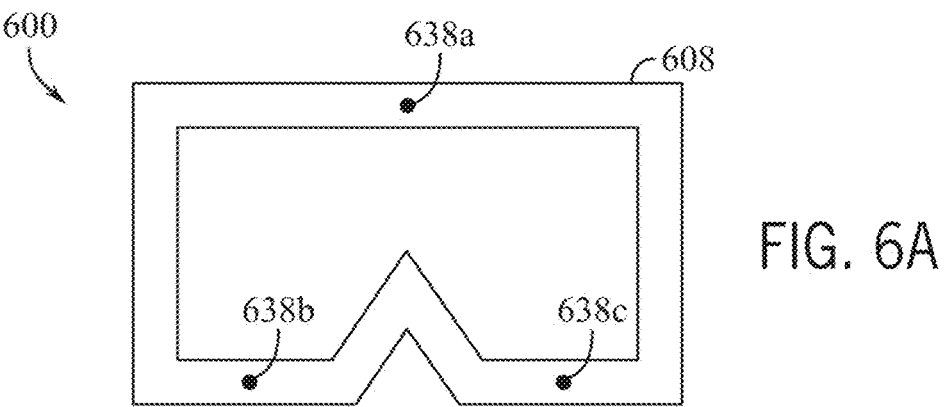
FIG. 6A shows an example of a facial interface in a first configuration.
Figure 6B:
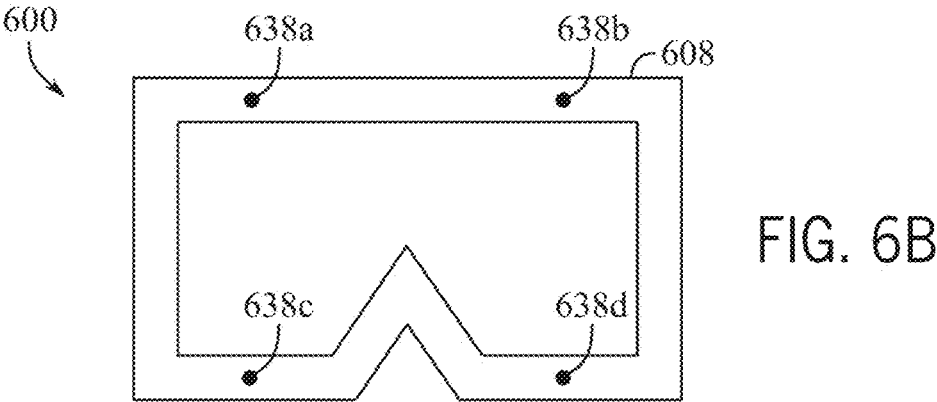
FIG. 6B shows an example of a facial interface in a second configuration.
Figure 6C:
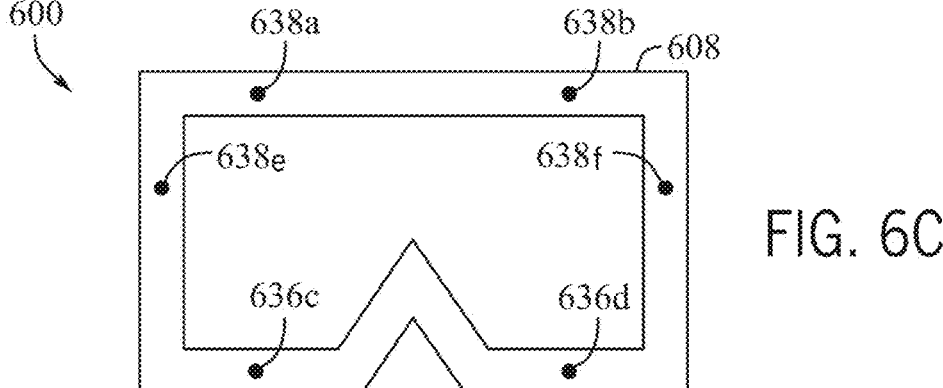
FIG. 6C shows an example of a facial interface in a third configuration.

FIGS. 6A-6C show a facial interface 600 including a frame 608 with different attachment points 638*a-f*. In some examples, a linear actuator can be secured to each attachment point 638*a-f*. When in use, the facial interface 600 can abut the face of a user. Different configurations of attachment points 638*a-f* can affect the comfort characteristics of the facial interface 600. FIG. 6A shows the frame 608 including attachment points 638*a-c*. Attachment point 638*a* can be disposed where the frame 608 can contact the forehead of a user when the facial interface 600 interface is in use. Attachment points 628*b-c* can be disposed where the frame 608 can contact the checks of a user. In some examples, attachment points 638*a-b* can be located over the maxilla or zygoma of a user when the facial interface 600 is in use. In some examples, the use of only one attachment point 638*a* located where the frame 608 can abut the forehead of a user can simplify adjustment of the facial interface via linear actuators while allowing the frame 608 to rotate about the axis defined by attachment points 638*b-c*.

FIG. 6B shows the frame 608 including attachment points 638*a-d*. In some examples, the frame 608 can include two attachment points 638*a-b* disposed where the frame 608 can contact the forehead of a user when the facial interface 600 is in use. The inclusion of two attachment points 638*a-b* located where the frame 608 can contact the forehead of a user can allow the frame 608 to deform between the two attachment points 638*a-b* in response to a force exerted by the forehead of a user, such as the deformation shown in FIG. 5B. Similar to the facial interface 600 shown in FIG. 6A, attachment points 638*c-d* can be located over the maxilla or zygomatic bone of a user when the facial interface 600 is in use. FIG. 6C shows the frame 608 including attachment points 638*a-f*. In FIG. 6C, the additional attachment points 638*d-f* can be located where the frame 608 can contact the temples of a user's head. Disposition of the attachment points 638*e-f* where the frame 608 can contact the temples of a user can allow linear actuators to extend further from the frame 608 at the temples than at the forehead, checks, or nose of a user. Disposition of the attachment points 638*e-f* where the frame 608 can contact the temples of a user can also allow the frame 608 to form a more uniform or tighter seal to the face of a user. Additionally, the inclusion of more attachment points 638*a-f* can reduce the force exerted on the face of a user at each attachment point 638*a-f*. The facial interface 600 can also include more attachment points than the attachment points 638*a-f*, and the positions of the attachment points 638*a-f* can be varied to optimize comfort.

Any of the features, components, and/or parts, including the arrangements and configurations thereof shown in FIGS. 6A-6C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6C. More examples of linear actuators, hinges, and plates are given below.

Figure 7B:
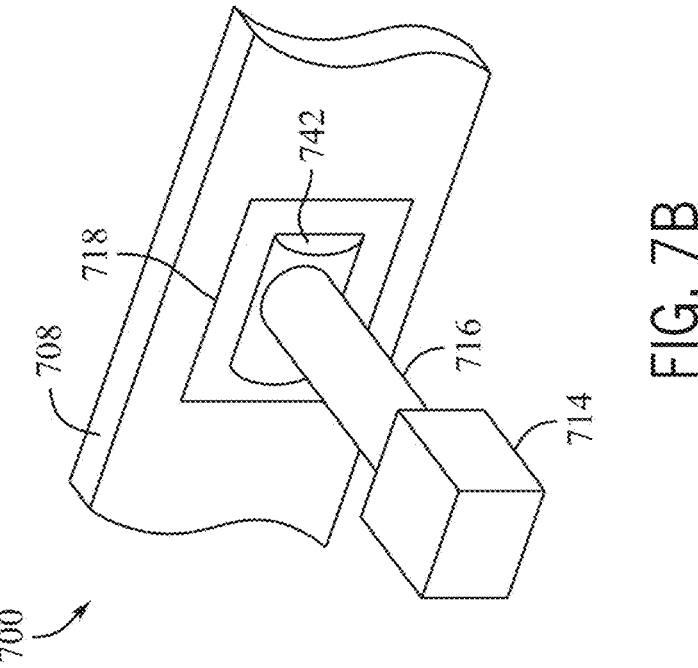
FIG. 7B shows an example of another joint.
Figure 7A:
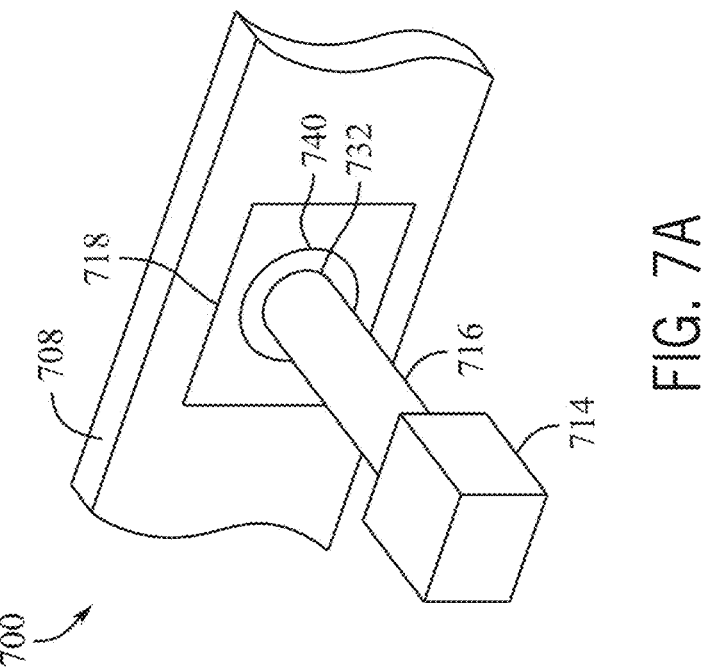
FIG. 7A shows an example of a joint.

FIGS. 7A-7B show examples of movable couplings 700. FIG. 7A shows a movable coupling including a linear actuator 714, a piston, a frame 708, and a plate 718. In some examples, the piston 716 can define a ball 732, and the plate 718 can define a cup 740 configured to receive the ball 732. The ball 732 and the cup 740 can be a ball joint defining three degrees of freedom, namely pitch, roll, and yaw. In some examples, the plate 718 can be translatable in two directions relative to the frame 708. The piston 716 can be driven in a third direction of translation relative to the frame 708. Therefore, the movable coupling 700 shown in FIG. 7A can define or control 6 degrees of freedom. Any of the degrees of freedom can be changed, modulated, or controlled to optimize the movable coupling 700 for comfort in the use of head-mounted display devices.

FIG. 7B shows a movably coupling 700 including a linear actuator 714, a piston 716, a frame 708, and a plate 718. In some examples, the piston can define a cylindrical end 742, and the plate 718 can be configured to receive the cylindrical end 742. In some examples, the cylindrical end 742 can define a single degree of freedom between the piston 716 and the plate 718, namely pitch. In some examples, the plate 718 can be translatable in at least one direction relative to the frame 708, and/or rotatable in at least direction relative to the frame 708. The piston 716 can be driven in another direction of translation relative to the frame 708. Any of the degrees of freedom defined by the movable coupling 700 can be changed, modulated, or controlled to optimize the movable coupling 700 for comfort in the use of head-mounted display devices. Additionally, the linear actuator 714 of either of the movable couplings 700 shown in FIGS. 7A-7B can be configured to disengage in response to an applied force above a threshold. Disengagement of the linear actuator 714 in response to an applied force above a threshold can help protect the device from external forces such as the face of a user, drop events, or other forces.

Any of the features, components, and/or parts, including the arrangements and configurations thereof shown in FIGS. 7A-7B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7A-7B.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, X® (formerly TWITTER®) ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A facial interface for a head-mounted display device, comprising:
   a first frame;
   a second frame; and
   a linear actuator movably coupling the first frame to the second frame;
   wherein:
      the linear actuator defines:
         a first end coupled to the first frame; and
         a spherical portion at a second end opposite the first end;
      the facial interface further comprises a plate movably secured to the second frame; and
      the plate is translatable relative to the second frame in a first direction and defines a slot configured to receive the spherical portion, the slot extending in a second direction different than the first direction.

2. The facial interface of claim 1, wherein the second frame is more flexible than the first frame.

3. The facial interface of claim 1, wherein the movable coupling between the linear actuator and the second frame defines five degrees of freedom.

4. The facial interface of claim 1, wherein the first end of the linear actuator is fixedly coupled to the first frame.

5. The facial interface of claim 1, further comprising a light seal including the second frame.

6. The facial interface of claim 1, wherein the linear actuator is configured to be driven in response to an input from a user.

7. A head-mounted display device, comprising:
   a display assembly including:
      a frame;
      a window;
      a light source configured to produce content displayed at the window;
      a facial interface;

a first adjustment motor extending from the frame to the facial interface; and a second adjustment motor extending from the frame to the facial interface; wherein:

the window is disposed between the first adjustment motor and the second adjustment motor;

the first adjustment motor is coupled to the facial interface at a first attachment point translatable in a first direction and a second direction relative to the facial interface;

the first attachment point defines a slot extending in the second direction and is configured to receive a first end of the first adjustment motor; and the second adjustment motor is coupled to the facial interface at a second attachment point translatable in the first direction.

8. The head-mounted display device of claim 7, wherein the first adjustment motor defines a distance between the frame and the facial interface.

9. The head-mounted display device of claim 8, further comprising a button electrically coupled to the first adjustment motor, wherein a manipulation of the button causes the first adjustment motor to change the distance.

10. The head-mounted display device of claim 7, further including:

a sensor configured to collect data; and a processor electrically coupled to the sensor, the first adjustment motor, and the second adjustment motor, the processor configured to drive the first adjustment motor and the second adjustment motor in response to the data.

11. The head-mounted display device of claim 7, wherein at least one of the first adjustment motor or the second adjustment motor is movably coupled to the frame.

12. The head-mounted display device of claim 7, wherein:

the first adjustment motor defines a spherical portion; and the slot is configured to receive the spherical portion.

13. The head-mounted display device of claim 7, wherein at least one of the first adjustment motor or the second adjustment motor is configured to adjust according to a user profile.

14. A display assembly for a head-mounted display device, comprising:

a frame;

a display coupled to the frame;

a facial interface comprising at least two attachment plates, each attachment plate of the at least two attachment plates defining a slot extending in a first direction and configured to receive a spherical joint; and at least two linear motors fixed to the frame, each linear motor of the at least two linear motors including the spherical joint rotatably secured to the facial interface, wherein the spherical joint is configured to displace along a length of the slot.

15. The display assembly of claim 14, wherein each linear motor of the at least two linear motors includes a piston extending between the frame to the facial interface.

16. The display assembly of claim 14, wherein each linear motor of the at least two linear motors is configured to disengage in response to an applied force above a threshold.

17. The display assembly of claim 14, wherein each attachment plate of the at least two attachment plates is translatable in a first direction and a second direction relative to the facial interface.

18. The display assembly of claim 14, wherein each linear motor of the at least two linear motors is configured to actuate independently.

19. The display assembly of claim 14, wherein the at least two linear motors are configured to actuate in unison.

* * * * *